(12) United States Patent
Tetrick

(10) Patent No.: US 7,089,399 B2
(45) Date of Patent: *Aug. 8, 2006

(54) ADAPTIVE PREFETCH OF I/O DATA BLOCKS

(75) Inventor: Raymond S. Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/659,920

(22) Filed: Sep. 11, 2003

(65) Prior Publication Data

US 2004/0078527 A1   Apr. 22, 2004

Related U.S. Application Data

(63) Continuation of application No. 09/317,442, filed on May 24, 1999, now Pat. No. 6,622,212.

(51) Int. Cl.
 *G06F 9/32* (2006.01)
 *G06F 9/38* (2006.01)

(52) U.S. Cl. .................. 711/213; 712/239; 712/237

(58) Field of Classification Search ............... 711/137, 711/112, 113, 213, 204
See application file for complete search history.

(56) References Cited

U.S. PATENT DOCUMENTS

| 5,146,578 A | 9/1992 | Zangenehpour ............. 711/137 |
| 5,600,817 A | 2/1997 | Macon, Jr. et al. ......... 395/464 |
| 5,623,608 A | 4/1997 | Ng ............................. 711/137 |
| 5,765,213 A | 6/1998 | Ofer ........................... 711/137 |
| 5,867,685 A | 2/1999 | Fuld et al. .................. 711/113 |
| 6,078,996 A | 6/2000 | Hagersten ................... 711/137 |
| 6,170,030 B1 | 1/2001 | Bell ............................ 710/129 |

*Primary Examiner*—B. James Peikari
(74) *Attorney, Agent, or Firm*—Schwegman, Lundberg, Woessner & Kluth, P.A.

(57) ABSTRACT

In an example embodiment, an adaptive method of prefetching data blocks from an input/output device comprises predicting the address of each read operation reading a data block from the input/output device, the prediction based on the address of the immediately preceding read operation from the input/output device; tracking, for each read operation, whether each read operation reads a block data from the same address of the input/output device predicted for the read operation; and prefetching a data block for a read operation from the input/output device in accordance with the state of a state machine, the state of the state machine depending upon whether immediately preceding read operations read a data block from the same address of the input/output device predicted for the read operations.

9 Claims, 5 Drawing Sheets

ADAPTIVE PREFETCH OF I/O DATA BLOCKS

This application is a continuation of U.S. patent application Ser. No. 09/317,442, filed May 24, 1999, now issued as U.S. Pat. No. 6,622,212, which is incorporated herein by reference.

BACKGROUND

1. Field of the Invention

This invention relates generally to methods and apparatus for prefetching I/O data blocks. In particular, the present invention relates to methods and apparatus for adaptively prefetching data blocks from the input/output devices of a server.

2. Description of the Related Art

The latency incurred when reading I/O data can greatly diminish performance since the requesting device usually requires the requested data in order to perform some pending process or instruction. It is conventional to attempt to effectively shorten the latency by prefetching the data expected to be requested in a read operation. However, most systems and methods for prefetching data in anticipation of a read operation operate either by design or by mode bit programming. In a prefetch by design, the data is always prefetched. Since a prefetch of data utilizes system resources, it can be extremely disadvantageous to always prefetch in applications where the prefetched data is rarely the data that is requested in the next read operation. In prefetch by mode bit programming, there is a bit in the read request that is programmatically set by processor instructions to indicate whether or not data should be prefetched. For example, a value of "1" for the mode bit indicates prefetch and a bit value of "0" for the mode bit indicates don't prefetch. The condition for setting the prefetch mode bit is static and usually predefined in an I/O interface of the processor requesting the data or in a memory controller for the memory from which the data is read. For example, in the 450GX chipset available from Intel Corporation, Santa Clara, Calif., read cycles for a PCI bus are divided into several different types (memory read, memory read line, memory read multiple, etc.) and prefetching is done only for certain designated types of cycles. When a command is issued, the mode bit is set according to the designation for that command.

Whether the prefetch is by design or by mode bit programming, it is carried out universally for all data requests made by the processor I/O interface or for all read operations handled by the memory controller for the memory. This can be quite disadvantageous, for example, in servers where a large amount of I/O data is frequently transferred between the processor, memory and several different I/O devices in different block sizes and the lack of efficiency in transferring I/O data blocks may have a larger effect on overall performance than the speed of the microprocessor has on overall performance. It also may be that the buses and/or I/O cards connecting the I/O devices to the microprocessor is the bottleneck and the performance of these I/O subsystem components to be improved.

Conventional servers typically have a significant number of I/O devices and a bus master for each I/O device. If there is any prefetch routine, it is carried out in common for all bus masters and in all circumstances. Even in those servers where prefetch is available, it is preset at design time or is set as a user option in response to a prompt during the set-up configuration of the system and is static from that time forward. Neither the user nor a processor in the system can change the prefetch mode bit during operation.

Even though the prefetch option may be selected during configuration, the performance of the server is still less than optimum because the I/O devices in the server may be of radically different types, store different kinds of data and/or vary from each other in the addressing sequence by which the data blocks containing the data are read out. For example, a pre-recorded CD-ROM may store large contiguous blocks of image data and the read out of such image data by an optical disk drive may consist of many sequential addresses. Another I/O device may store heavily fragmented user data and the data readout from such a device rarely consists of sequential addresses. A prefetch system designed for a single microprocessor, such as that described in U.S. Pat. No. 5,537,573, is not suitable for use in a server.

SUMMARY

The present invention is directed to adaptive prefetch of I/O data blocks. In a first aspect of an example embodiment, an adaptive method of prefetching data blocks from an input/output device comprises predicting the address of each read operation reading a data block from the input/output device, the prediction based on the address of the immediately preceding read operation from the input/output device; tracking, for each read operation, whether each read operation reads a data block from the same address of the input/output device predicted for the read operation; and prefetching a data block for a read operation from the input/output device in accordance with the state of a state machine, the state of the state machine depending upon whether immediately preceding read operations read a data block from the same address of the input/output device predicted for the read operations.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

An example embodiment of the present invention seeks to decrease the inefficiencies of the transfer of data blocks from input/output devices in a server, such as what occurs when the transfer of an I/O data block collides with a request for data from a processor. In particular, the example embodiment attempts to reduce the latency when an element of the server, such as one of the processors, attempts to read a data block from an input/output device either for the execution of instructions or to store the data block in system memory and to optimize the coordination of the transfer of I/O data blocks.

One example application of the invention is in a processor or chipset having performance counters for performance monitoring. In particular, an example embodiment of the invention can be incorporated in the input/output control circuit of a server device to operate in conjunction with a processor, such as in the Intel Pentium II Xeon™ or Pentium III Xeon™ processor. It is sometimes desirable in such a processor to count and store multiple events and calculate a moving average. A moving average obtained by the example embodiment of the invention allows the current state of the system, such as the average memory latency or number of cache hits, to be tracked. These averages can be used, for example, to adjust prefetch processes in control software. However, such an embodiment is but one possible example of the invention which may, of course, be applied in any computer having a processor and an input/output device and indeed in any device wherever an improvement in reading data blocks from an I/O device is desired for whatever reason.

Figure 1:
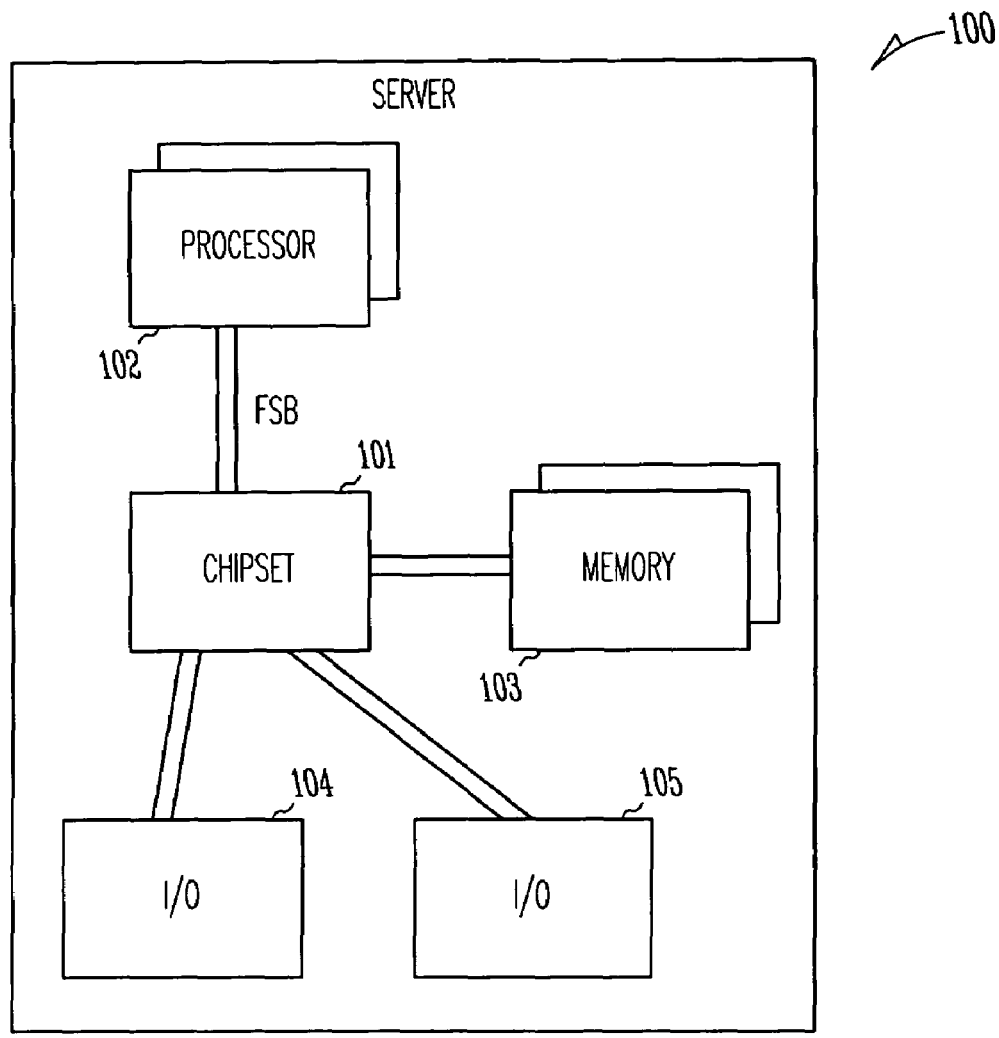
FIG. 1 is a generalized block diagram providing a basic illustration of a server in which an example embodiment of the invention may be practiced.

FIG. 1 is a generalized block diagram providing a basic illustration of a server in which an example embodiment of the invention may be practiced. There are usually multiple processors (2 or 4) 102, a large amount of memory 103, an I/O subsystem having multiple I/O devices 104, 105, and a chipset 101 which coordinates the I/O subsystem with processors 102 via a front-side bus FSB. Memory 103 can be implemented as a single memory or as two separate memories, but in either case there is only one connection to chipset 101.

Figure 2:
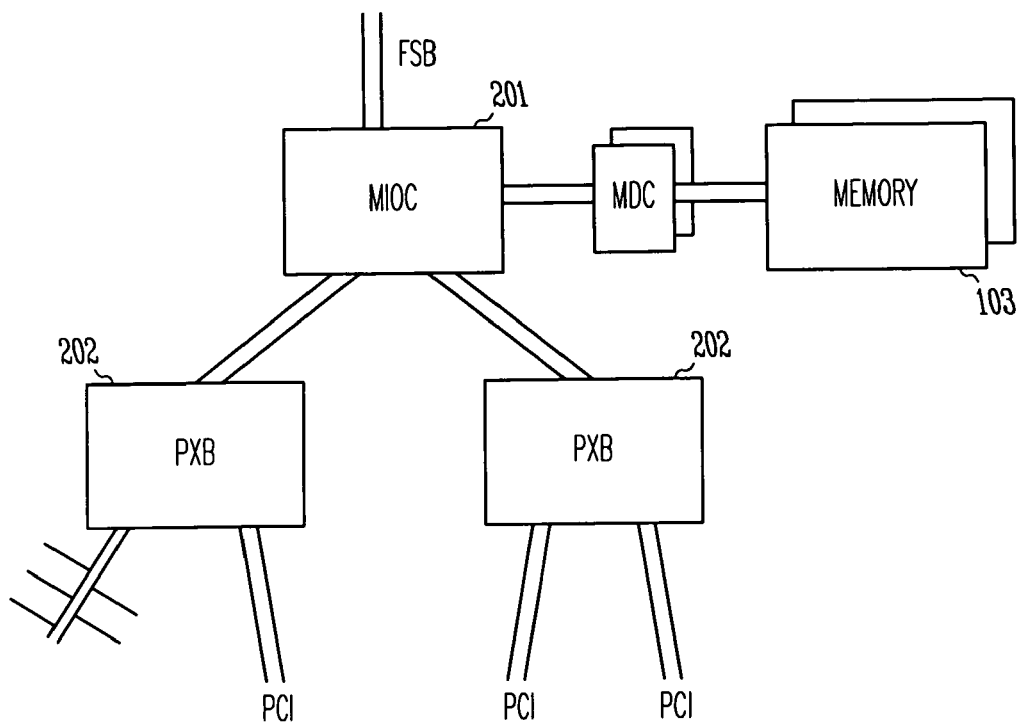
FIG. 2 is a somewhat detailed block diagram illustrating possible I/O related parts of a server in which an example embodiment of the invention may be practiced.

The chipset 101 may be comprised of multiple chips. Preferably, one of the chips is a Memory and I/O Controller (MIOC) 201 shown in FIG. 2, which connects to memory 103 via buffer chips MDC. A PXB 202 connects MIOC 201 to one 64 bit (wide version) or 32 two bit high performance Peripheral Component Interconnect (PCI) synchronous buses. As shown in FIG. 2, there may be two (or more) PXBs 202. The PCI buses are preferably supported with automatic configurability and multiplexed address, control and data lines as described in the latest version of "PCI Local Bus Specification, Revision 2.1" set forth by the PCI Special Interest Group (SIG) on Jun. 1, 1995. Currently, the PCI architecture provides the most common method used to extend computer systems for add-on arrangements (e.g., expansion cards) with new disk memory storage capabilities.

All of the I/O devices plug into one of the PCI buses via an I/O interface, which is usually an I/O card which plugs directly into a slot on the PCI bus. The I/O cards may be, for example, an Ethernet card or a SCSI card. Each one of the I/O cards has a PCI bus master (not shown) for requesting and obtaining access to the PCI bus and translating PCI cycles on the PCI bus to a form usable by the connected device. (For the sake of simplicity, the I/O cards are represented only on the leftmost of the PCI buses in FIG. 2.) There are generally multiple cards plugged into a PCI bus so that on just one single PCI bus, there can be up to about five bus masters, that is master one, master two, etc . . .

Figure 3:
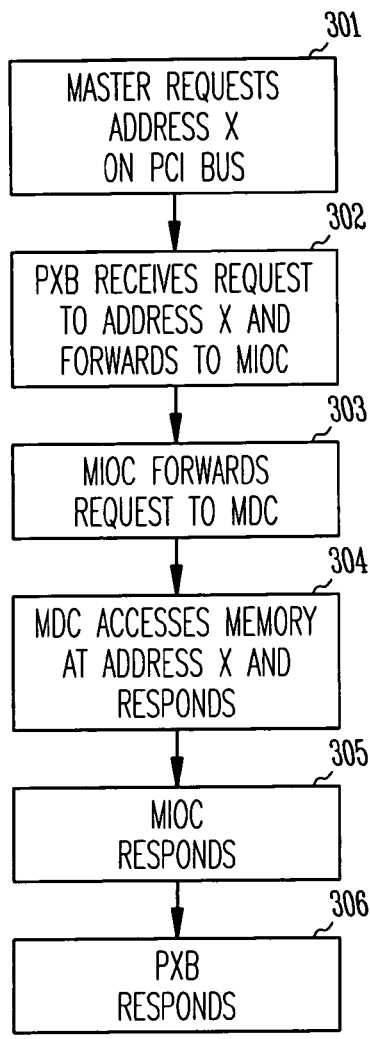
FIG. 3 is a flowchart illustrating the steps of an example read operation in which an I/O data block is transferred to memory using the I/O related parts of the server shown in FIG. 2.

The bus master is the I/O card circuit or device that connects to a PCI bus and actually forwards data requests up to chipset 101 or MIOC 201. Conventionally, if the bus master does a write operation to memory 103, it tells the connected I/O device that the write operation is complete as soon as all the data is stored in the PXB 202. The PXB 202 can then move the data to the MIOC 201 and the MIOC 201 can then move it to memory 103. The data gets to memory 103 at a delayed time after the write operation begins, but there isn't any memory access latency from the viewpoint of the connected I/O device since the bus master more quickly reports that the write operation is completed. An example of the process where the data is transferred to MIOC 201 and stored in memory 103 is shown in FIG. 3. At step 301, one of the masters requests address X on its respective connected PCI bus. In the system shown in FIG. 2, the PXB 202 would, on the PCI bus, receive the request from the PCI bus to address X and forward the request to MIOC 201 (step 302). MIOC 201 receives the request from PXB 202 and forwards it to the MDC device (step 303). The MDC accesses memory 103 at address location X and responds with a signal (step 304) after the data has been written at address location X. MIOC 201 responds to the signal and forwards it back down to the PXB (step 305). PXB 202 responds to the signal and forwards it back to the originating master (step 306).

Although, in the example, the master initiates the transfer of data to memory 103, most of the necessary data command structures are contained in a portion of the memory space of memory 103. So, for example, if there is a command block that instructs the transfer of a data block out to a master on an ethernet card (i.e., to transfer a block of data and move it onto a local area network) or to receive an incoming packet, the command blocks and the data block are usually contained in the memory space of memory 103.

Similar to the explanation provided above, the reading of an I/O data block on the PCI buses are typified by a relatively long start up latency. But when the bus master wants to read data from an address location of the memory, the latency can't be hidden. The only way it can be effectively shortened is by prefetching or buffering or caching. Once a data read cycle is started, there is first the latency and then data is transferred rapidly, usually at the bus rate of the PCI bus. See, for example, FIG. 4 which provides an example of the transfer of data blocks (not to scale) from sequential addresses X, X+1, X+2, X+3, etc. This latency may be even longer and even more complicated in server systems because there is so much competition for memory 103 with the processors 102 and multiple I/O devices 104, 105 each going through MIOC 201. For such reasons, prefetching may be of greater advantage in the I/O subsystem of a server because the server is generally dealing with bigger blocks such as an ethernet packet or SCSI disc block.

Figure 5:
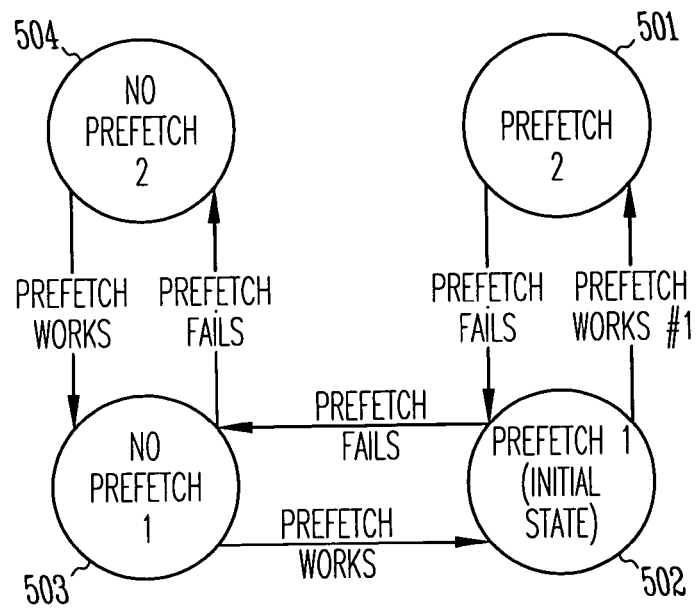
FIG. 5 shows the 4 state machine utilized in an example embodiment of the invention.

The prefetching utilized in the example embodiment of the invention is based on the actual results of past I/O read options to determine whether chipset 101 or MIOC 201 should prefetch or not. The preferred state machine shown in FIG. 5 has four different states. In the top two (501, 502) of the four states, prefetching is carried out, and in the other bottom two (503, 504) of the four states, prefetching is not carried out. The state machine need not be that shown in FIG. 5, but there is in any event a prefetch circuit which does not prefetch until it determines that prefetching will be successful. Once prefetching is successful and is consistently successful, then the prefetch circuit biases itself toward prefetching by using the top state 501. Once prefetching starts to not be so successful, it falls back into a prefetch or not prefetch condition 502, where if it fails the next time, it will quit prefetching and it if it works the next time, it will resume prefetching. Conversely, if prefetching is unsuccessful and is consistently unsuccessful, then the prefetch circuit biases itself toward not prefetching by using the bottom state 504. Once prefetching would be successful, it rises into a prefetch or not prefetch condition state 503, where if it works the next time, it will prefetch and if it fails the next time, it will discontinue prefetching. This process is generally referred to as tracking.

There are different possible points in the server to implement the prefetch circuit. The first possible implementation is at a somewhat centralized (but not shared) location. This implementation takes advantage of the fact that I/O cards are a standard component of input/output subsystems and generally don't include any circuitry or software for effectuating prefetch of data blocks. In the context of this application, they can be considered "dumb" I/O cards. This example implementation of the invention uses such dumb I/O cards because they are standardized and less expensive than non-standard I/O cards, and performs the prefetch in the chipset 101, MIOC 201 or PXB 202 control prefetch for each of the I/O cards. The prefetch, preferably the state machine, isn't done directly on the I/O card, it's done elsewhere and the results then go to the respective bus master on the corresponding I/O card. The bus master need not operate differently, but there will still be improved performance. It is preferable that there is a different prefetch circuit (i.e., state machine) for each master. Each prefetch circuit looks at its own respective master on the PCI bus and determines whether prefetching has been a benefit to that master or is the master's traffic pattern so random that prefetching should not be done. Since it applies to each master, the prefetch decision is made per master and I/O card based on the operation of that particular master and I/O card.

The prefetch circuit would preferably be in a PXB 202 if there are a relatively large number of bus masters on the PXB's connected PCI buses and/or one of the I/O devices on the connected PCI bus has a particularly high I/O data transfer rate. (FIG. 1 is a simplistic drawing only, there may be more than I/O devices 104 and 105, and the I/O devices may be radically different from each other. For example, one I/O device may be a CD-ROM drive and the other may be a high speed communications terminal.) But for the most part, the PCI standard defines the maximum number of masters insofar as it can only support electrically so many slots, which is generally about five. However, the input/output characteristics of each I/O device may be so high as to put significant I/O demands on the PXB 202.

On the other hand it may be easier to integrate the prefetch circuit into chipset 101 or MIOC 201, where these elements can be standardized in any way and utilized in a number of different types of servers. However, for a low end server chip set which actually uses desk top chips, the chipset 101 and PXB 202 might be all integrated into one package.

Figure 6:
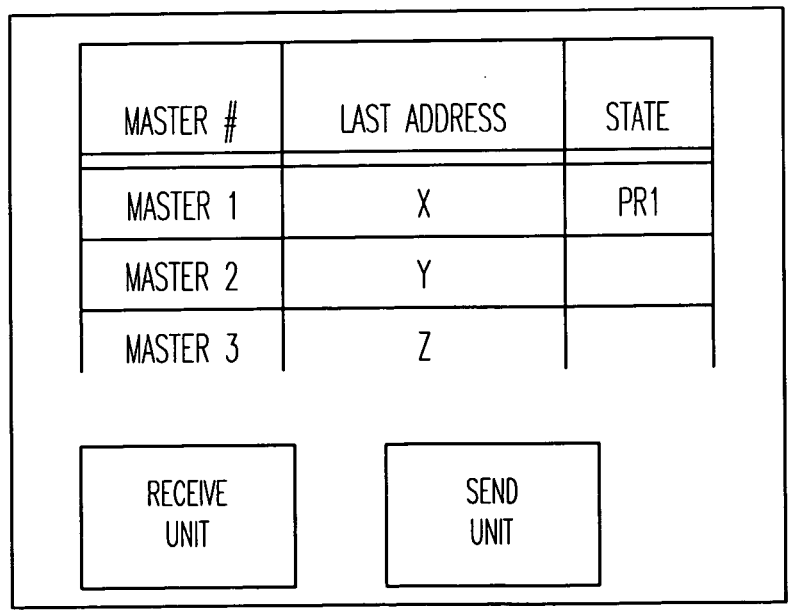
FIG. 6 shows a logical representation of the implementation of a state machine into the MIOC of FIG. 2.
Figure 7:
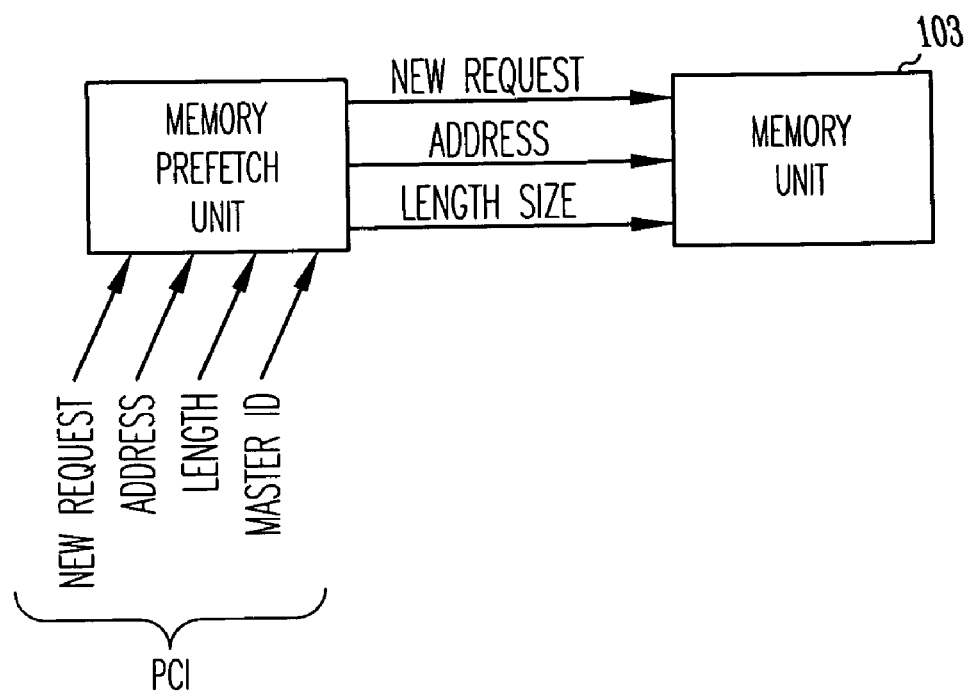
FIG. 7 shows the connections to and from a memory prefetch unit in the MIOC of FIG. 2.

Preferably, the prefetch circuit is implemented as an internal hardware state machine rather than software implementing the state diagram. FIGS. 6 and 7 illustrate how the state machine might be implemented in MIOC 201. The table shown in FIG. 6 is symbolic only. There is both a receive unit and a send unit in MIOC 201 that receives various information signals as shown in FIG. 7. The New Request, Address, Length and Master ID signals shown in FIG. 7 come from I/O devices via a PCI bus and then are received in the receiving unit inside the MIOC 201 that is also connected to the table.

The New Request signal indicates when a new request is coming in (see step 303 in FIG. 3). The Length signal indicates the size of the data block to be prefetched, thereby indicating how much address space is needed. It can indicate, for example, the start and end address or a similar block size description when a new request is received at a certain address. If the state machine is in the initial prefetch state shown in FIG. 5 when New Request, Length, Address and Master ID signals are received from the master, prefetching is carried out. The request is received, the prefetched data block starts at the indicated address and the length is increased or decreased to accomplish the prefetch of whatever size is indicated. In other words, when prefetching, the prefetch circuit preferably also accounts for the size of the data block to be prefetched. There may be some set system length parameter, either fixed, a chipset implementation or some basic unit. Preferably, a basic unit is set for the data blocks which is equal to the processor 102 or memory 103 cache line size or multiple cache lines. However, the data blocks may be of different sizes and the addressing is controlled according to the data block size using the Length signal.

Figure 4:
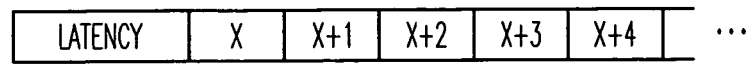
FIG. 4 is a diagram illustrating a sequence of addresses for I/O data blocks to which the adaptive prefetch method of this invention is advantageous.

In an example embodiment, the prefetch circuit tracks success or failure in its simplest sense. The prefetch circuit assumes that it is best to sequentially access memory locations. If successive addresses are used (as shown in FIG. 4), the average latency over multiple successive addresses can be reduced. This can continue for a long very time for long blocks of data. If based on first access to address location X, the prefetch circuit will speculatively get address X+1 in the hopes that, based on behavior in the past, the read operation is likely to use address X+1. The only thing the prefetch circuit tracks is whether the prefetch works or fails. If it prefetches address X+1, then the only aspect tracked is whether the subsequent read operation actually access and read data at address X+1. In such a situation, the prefetch circuit does not use the block size when determining whether or not to prefetch. However, it does use the block size to determine the actual address corresponding to "X+1". For example, if the block size is 32, then the actual address location prefetched is the address location incremented by 32 with respect to the previous address location. As indicated in FIG. 4 and elsewhere in this application, "X+1" refers to the start address of the next data block and not necessarily the immediately subsequent address.

The prefetch circuit determines whether the address speculatively predicted actually occur before the next access. So, if there was a request for X and then X+1 was the speculatively predicted next address for prefetching, and then the read operation returned X+1 and X+2, the prefetch worked since the prefetched address worked even though X+2 was also received. The prefetch fails when the next address is not the prefetched address. This means that the data phase of the I/O read operation continues. In this simplest form, the state machine is just prefetch algorithm unless it guesses wrong twice in a row. Either it prefetches wrong twice in a row or it should have prefetched two times in a row and it didn't.

In contrast, to this simple algorithm, another embodiment can prefetch a multiple number of cache lines. The prefetch works condition is modified to required that the correct number of cache lines is received. The prefetch depth can also be varied during operation to provide a further level of adaptability to adjust to operating conditions. The system can thus respond to conditions of the card at the time of operation, rather than a static design made at decision time or boot time.

An even more complex embodiment of the invention may be used in conjunction with performance analysis of an I/O card installed on a PCI bus where the performance of the I/O card could be improved based on the calculated moving average. The performance could be monitored by an averaging measurement circuit located in the chipset 101, MIOC 201 or the I/O card itself. A preferred moving averaging measurement circuit.

A further advantage of implementing the prefetch circuit in chipset 101 or MIOC 201 can also be understood by reference to FIG. 6. In a server with a large number of I/O devices, there may frequently be a read operation for one bus master where the prefetch state diagram is operated to conduct prefetching of a data block from the master and then a I/O data transfer request is received from another master before the next read operation is requested from the first master. The table in FIG. 6 is used to store a different entry in the table for each master. Assume the second requesting master is master 6. The data transfer for the second master (master 6) is operated according to the status of the unique state machine for that master. If the first requesting master (assume it is master 5) makes another request, then the I/O data transfer is operated again using the state machine for master 5 in whatever state master 5 was in when the I/O data transfer request for master 6 was received. So master 5 may have updated this state (or maybe not), based on the fact that previous prefetches had passed or failed (had been successful or not). Because of the centralized location (but not shared state machines), it doesn't matter if there is an intervening request from another master.

The prefetch circuit saves the state diagram for each master until it breaks down and goes back to the initial state. In particular, this multitasking of I/O data transfers is not with regard to any timing. Even in the situation where there are several masters working and then one finishes and then comes back in fifteen minutes, the state machine will still be in the same state for that master. If the master is then doing a I/O data transfer request, the table will be used but then quickly, in two states, it will move into a state when it realizes that there's a different (non-sequential) data request and prefetching is not carried out.

This implementation facilitates an important feature of tracking prefetch success per master. This allows independent masters to behave in different ways, even relatively simultaneously in a multitasking mode, and still adapt prefetching individually on a per master basis using a centralized and easily integrated prefetching circuit.

The preferred hardware implementation gives a distinct advantage over software. This advantage can best be seen by a comparison with the prefetch by mode bit programming approach. Even though there might be an ability to set prefetch by software, there is typically a lack of understanding of when and how prefetching should be attempted. A software programmer is generally concerned with matters other than optimizing the prefetching of I/O data blocks in a read operation. A hardware implementation can run in the background without having any effect on performance of what is happening in the foreground. Since, in a server, most of the I/O data transfer requests go through a single input/output control circuit, it's best to optimize the data requests through that circuit at all times. This helps avoid the processor or other elements from having to expend system resources to accomplish transfer of I/O data blocks since the prefetching can automatically accomplish these functions.

This hardware may advantageously be combined in the hardware of MIOC 201 with a moving average measurement circuit. However, simpler embodiments of the invention are preferred which use a binary model based on the success or failure of previous prefetch decisions. Such a simpler embodiment can be implemented by a comparison between the last address saved in the table shown in FIG. 6 and the new request address. Either prefetch works because there is an exact match or the new request address is within a prefetch range (for example, if four lines are prefetched, then the requested address is one of those four lines). The result of the comparison is used to update the state machine and the table shown logically in FIG. 6.

The state table in FIG. 6 is preferably set up as a register file where there is one register per bus master. The register file includes the last address and a 2-bit field indicating the state of the state machine. (If a state machine with five, six, seven or eight states is used, then the field is composed of three bits.) The 2-bit field is updated according to the output of each comparison and the last address requested is written to the file each time there is a data read operation from an address when the operation is finished. The appropriate latches and timing are provided in a manner well known to those in the art in order to accomplish storage of the data into the register file.

Although an example embodiment, the invention is not limited to the Intel Pentium II Xeon™ or Pentium III XEON™ processor or MIOC 201. Indeed, an advantage of the exemplary embodiments of the invention is that they are particularly useful and widely adaptable to any I/O device having latency in read operations. In this way, the chipset 101 or MIOC 201 can be used in both a server that has a great deal of network I/O interfaces and a server that has a great deal of I/O disk interfaces. The example embodiments will automatically adapt to the disk interfaces which will generally transfer large blocks of data rather than small blocks of data. Indeed, the example embodiments will adapt to any I/O data interface using only the memory addressing and without knowing the identity or type of I/O data interface. There will be no need for a network administrator to select an appropriate prefetch option in the setup configuration menu based on these factors. Nor will there be a need for a software programmer to write software that will have to detect which types of interfaces are used and provide a program which uses that information to adapt the prefetch algorithm of the I/O data read operations.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A system, comprising:
an Input/Output (I/O) control circuit to control transfer of data between a memory and an I/O device; and a prefetch circuit to prefetch a data block into the memory in advance of a subsequent read made from the I/O device, wherein the data block is prefetched from a predicted address of the I/O device based on a preceding address associated with a previous read from the I/O device, and wherein the subsequent read is tracked to determine if the subsequent read reads from the predicted address, and wherein the prefetch circuit is adapted to perform at least one of to continue prefetching in response to the subsequent read and to stop prefetching in response to the subsequent read, and wherein the predicted address begins within the I/O device at a location of the preceding address plus a length of a preceding data block associated with the previous read plus 1.

2. A system, comprising:

a processor;

an Input/Output (I/O) device; and a prefetch interface to prefetch data from the I/O device in advance of a request made by the processor for that data, wherein the prefetch interface predicts an address needed within the I/O device to satisfy the request, and wherein the prefetch interface tracks its performance and performs at least one of, in response to success rates, continues to prefetch for additional data and stops prefetching for the additional data, and wherein the prefetch interface is self-configurable to determine when to bias in favor of prefetching and when to bias against prefetching based on moving averages associated with the success rates, and the prefetch interface includes a state machine that performs the tracking and self-configuration, and wherein the state machine includes a first state where prefetching takes place and a second state where prefetching is suspended and the state machine includes a third state that biases towards prefetching and a fourth state that biases towards not prefetching.

3. A method, comprising:

prefetching a data block for a predicted address within Input/Output (I/O) device in advance of a read request made from a processor based on prior read requests made to the I/O device;

tracking a success rate of the predicted address when the request is made by the processor; and adjusting the prefetching for subsequent predicted addresses based on the success rate in advance of subsequent read requests made by the processor, and wherein prefetching is not performed if the success rate includes two or more successive failures.

4. The method of claim 3 further comprising biasing in favor of not performing the prefetching when the tracking demonstrates an unacceptable success rate.

5. The method of claim 3 further comprising biasing in favor of the prefetching when the tracking demonstrates an acceptable success rate.

6. The method of claim 3 wherein prefetching further includes predicting the predicted address based on a prior read request made by the processor.

7. The method of claim 6 wherein the predicting further includes using a prior address within the I/O device associated with the prior read request to predict the predicted address.

8. The method of claim 3 wherein the tracking further includes defining the success rate to include partial success where at least a portion of the prefetched data block satisfies the read request.

9. The method of claim 3 wherein the adjusting further includes processing a state machine to bias in favor of performing the prefetching or to bias against the prefetching.

* * * * *